US012763373B2

(12) United States Patent
Byun et al.

(10) Patent No.: US 12,763,373 B2
(45) Date of Patent: Oct. 13, 2026

(54) BATTERY CELL AND MANUFACTURING METHOD THEREOF

(71) Applicant: LG Energy Solution, Ltd., Seoul (KR)

(72) Inventors: Gahngmin Byun, Daejeon (KR); Gi Man Kim, Daejeon (KR); Sung Yun Kwak, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 787 days.

(21) Appl. No.: 17/924,246

(22) PCT Filed: Sep. 8, 2021

(86) PCT No.: PCT/KR2021/012227
§ 371 (c)(1),
(2) Date: Nov. 9, 2022

(87) PCT Pub. No.: WO2022/092549
PCT Pub. Date: May 5, 2022

(65) Prior Publication Data

US 2023/0275321 A1 Aug. 31, 2023

(30) Foreign Application Priority Data

Oct. 27, 2020 (KR) ........................ 10-2020-0140347
Sep. 3, 2021 (KR) ........................ 10-2021-0117898

(51) Int. Cl.
*H01M 10/0585* (2010.01)
*H01M 10/052* (2010.01)
(Continued)

(52) U.S. Cl.
CPC ..... *H01M 10/0585* (2013.01); *H01M 10/052* (2013.01); *H01M 50/46* (2021.01); *H01M 50/466* (2021.01); *H01M 50/531* (2021.01)

(58) Field of Classification Search
CPC ..... H01M 50/46; H01M 50/461; H01M 50/54
See application file for complete search history.

(56) References Cited

U.S. PATENT DOCUMENTS

2011/0052964 A1* 3/2011 Kim .................. H01M 10/0583 429/152
2011/0135996 A1* 6/2011 Ahn .................... H01M 50/426 429/162
(Continued)

FOREIGN PATENT DOCUMENTS

CN 107949932 A 4/2018
CN 110050374 A 7/2019
(Continued)

OTHER PUBLICATIONS

Machine translation of Lee et al. KR-20120052041-A. (Year: 2012).*
(Continued)

*Primary Examiner* — Basia A Ridley
*Assistant Examiner* — Julia Marie Fehr
(74) *Attorney, Agent, or Firm* — Lerner David LLP

(57) ABSTRACT

A battery cell includes an electrode assembly formed by stacking a first separator, a negative electrode plate, a second separator, and a positive electrode plate; a negative electrode tab protruding from the negative electrode plate; and a positive electrode tab protruding from the positive electrode plate, the first and second separators have larger size in all four surfaces than the negative and positive electrode plates, and the whole of the tab edge portions of the first and second separators located on the surface on which the positive electrode tab and the negative electrode tab are formed and a part of the both side edge portions connected to the tab edge portion are adhered to each other, the inward adhesion width at the tab edge portion is smaller than the inward adhesion width at both ends where the tab edge portion and the both side edges portions are connected.

4 Claims, 1 Drawing Sheet

(51) Int. Cl.

| | |
|---|---|
| ***H01M 50/46*** | (2021.01) |
| ***H01M 50/466*** | (2021.01) |
| ***H01M 50/531*** | (2021.01) |

(56) References Cited

U.S. PATENT DOCUMENTS

| | | | | |
|---|---|---|---|---|
| 2012/0189895 | A1* | 7/2012 | Gutsch ................ | H01M 50/463 429/162 |
| 2016/0111699 | A1* | 4/2016 | Ahn .................... | H01M 50/461 429/211 |
| 2019/0088928 | A1* | 3/2019 | Kishi .................... | H01M 4/131 |
| 2020/0185675 | A1 | 6/2020 | Lee et al. | |
| 2020/0235360 | A1 | 7/2020 | Lim et al. | |
| 2020/0235434 | A1 | 7/2020 | Lee et al. | |
| 2021/0126325 | A1 | 4/2021 | Zhang et al. | |

FOREIGN PATENT DOCUMENTS

| | | | | | |
|---|---|---|---|---|---|
| CN | 209785987 | U | | 12/2019 | |
| JP | H09213377 | A | | 8/1997 | |
| JP | H10188938 | A | * | 7/1998 | |
| JP | 2011238357 | A | | 11/2011 | |
| JP | 2016038995 | A | | 3/2016 | |
| KR | 20110063899 | A | | 6/2011 | |
| KR | 20120052041 | A | * | 5/2012 | .......... H01M 50/183 |
| KR | 20130122564 | A | | 11/2013 | |
| KR | 20160071108 | A | | 6/2016 | |
| KR | 101720387 | B1 | | 3/2017 | |
| KR | 20170072487 | A | | 6/2017 | |
| KR | 101775213 | B1 | | 9/2017 | |
| KR | 101807354 | B1 | | 12/2017 | |
| KR | 20190054491 | A | | 5/2019 | |
| KR | 20200095897 | A | | 8/2020 | |

OTHER PUBLICATIONS

Machine translation of lechi et al. JP-H10188938-A. (Year: 1998).*

International Search Report for Application No. PCT/KR2021/012227 mailed Jan. 3, 2022, pp. 1-3.

Extended European Search Report including Written Opinion for Application No. 21886546.7 dated Aug. 22, 2023, pp. 1-9.

* cited by examiner

【FIG. 1】
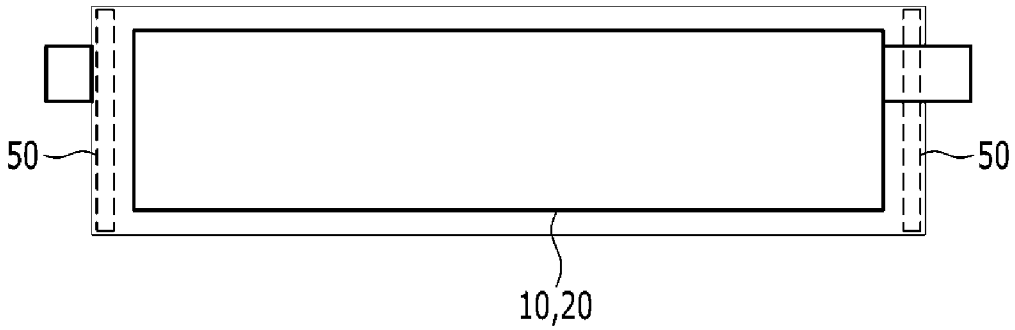
【FIG. 2】
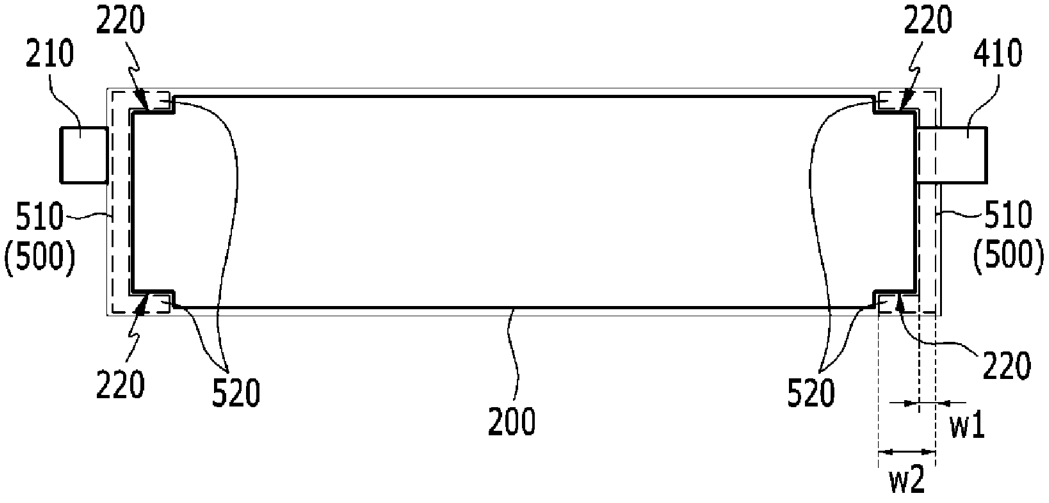
【FIG. 3】
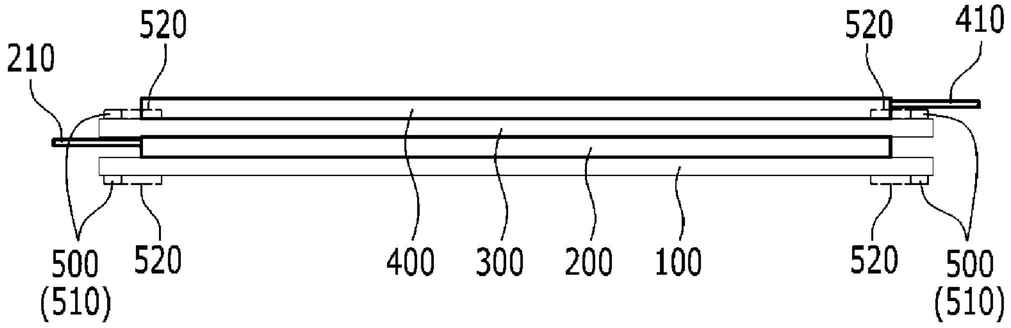

BATTERY CELL AND MANUFACTURING METHOD THEREOF

CROSS-REFERENCE TO RELATED APPLICATIONS

This application is a national stage entry under 35 U.S.C. § 371 of International Application No. PCT/KR2021/012227, filed on Sep. 8, 2021, which claims priority to Korean Patent Application No. 10-2020-0140347 filed on Oct. 27, 2020, and Korean Patent Application No. 10-2021-0117898 filed on Sep. 3, 2021, the disclosures of which are incorporated herein by reference in their entireties.

TECHNICAL FIELD

The present disclosure relates to a battery cell and a manufacturing method thereof, and more particularly to a battery cell that realizes sealing technologies and a manufacturing method thereof.

BACKGROUND

Recently, as energy source price is increasing due to the depletion of fossil fuels and increasing interest is being paid to environmental pollution, the demand for environmentally-friendly alternative energy sources is bound to play an important role in the future life. Thus, research into techniques for generating various kinds of power, such as nuclear energy, solar energy, wind energy, and tidal power, is underway, and power storage apparatuses for more efficient use of the generated energy are also drawing much attention.

In particular, as technology development and demands for mobile devices increase, the demand for batteries as energy sources is rapidly increasing, and accordingly, many researches on batteries capable of meeting diverse demands have been conducted.

Typically, the demand for the lithium secondary battery, such as a lithium ion battery or a lithium ion polymer battery, which have advantages such as a high energy density, a discharge voltage, an output stability, and the like is high.

Further, the secondary battery may be classified based on how the electrode assembly, having a structure in which a positive electrode, a negative electrode, and a separator interposed between the positive electrode and the negative electrode are stacked, is structured. Typically, the electrode assembly may include a jelly-roll (wound) type electrode assembly in which long sheet type positive electrodes and long sheet type negative electrodes are wound with a separator being interposed therebetween, and a stacked (laminated) type electrode assembly in which a plurality of positive electrodes and negative electrodes, cut into predetermined unit sizes, are sequentially stacked with separators being interposed therebetween, and the like.

Further, the secondary battery is classified based on the shape of a battery case into a cylindrical battery having an electrode assembly mounted in a cylindrical case, a prismatic battery having an electrode assembly mounted in a prismatic case, and a pouch-shaped case having an electrode assembly mounted in a pouch-shaped case formed of an aluminum laminate sheet.

In the case of a pouch-type battery cell, the electrode assembly stacked in the order of a separator, a negative electrode, a separator, and a positive electrode is inserted into the pouch case, and then the pouch case can be sealed together with an electrolytic solution, and adhesion between the separators may also be required.

FIG. 1 is a view showing an adhesion method between separators according to the related art.

Referring to FIG. 1, conventionally, in order to press the separator 20 interposed between the negative electrode plate and the positive electrode plate 10 and on one side thereof to adhere the separators to each other, an adhesion process between the separators was performed by pressing the separators using a straight sealing member 50 on the portion where the negative electrode tab and the positive electrode tab were formed.

However, since the sealing member 50 herein is formed in a straight shape, a relatively weak adhesive force is acted on the corner portions of the separators corresponding to both end parts of the sealing member 50, which may cause a folding phenomenon of the separators. Further, the portion where the sealing member is pressed during the sealing process and the portion where the negative electrode plate or the positive electrode plate is formed overlap with each other, whereby an interference phenomenon due to the pressing of the sealing member may occur on the negative electrode or the positive electrode is likely to occur.

DETAILED DESCRIPTION OF THE INVENTION

Technical Problem

It is an object of the present disclosure to provide a battery cell for preventing folding of the separator during the separator adhesion process, and a manufacturing method thereof.

The objects of the present disclosure are not limited to the aforementioned objects, and other objects which are not described herein should be clearly understood by those skilled in the art from the following detailed description.

Technical Solution

In order to achieve the above object, according to one embodiment of the present disclosure, there is provided a battery cell comprising:

an electrode assembly formed by sequentially stacking a first separator, a negative electrode plate, a second separator and a positive electrode plate having a rectangular shape;

a negative electrode tab formed to protrude from the negative electrode plate; and a positive electrode tab formed to protrude from the positive electrode plate, wherein the first separator and the second separator have larger size in all four surfaces than the negative electrode plate and the positive electrode plate, and the whole of the tab edge portions of the first and second separators located on the surface on which the positive electrode tab and the negative electrode tab are formed and a part of the both side edge portions connected to the tab edge portion are adhered to each other, whereby the inward adhesion width at the tab edge portion is smaller than the inward adhesion width at both ends where the tab edge portion and the both side edges portions are connected. At this time, the inward adhesion width at the tab edge portion may be 2% to 50% smaller than the inward adhesion width at both ends where the tab edge portion and the both side edges portions are connected.

The positive electrode plate and the negative electrode plate may not interfere with the adhered portions of the first and second separators. More specifically, a recessed portion corresponding to the adhesive shape may be formed at the four corners of the negative electrode plate, so that the negative electrode plate does not interfere with a portion to which a part of both side edge portions of the first and second separators are adhered.

In order to achieve the above object, according to another embodiment of the present disclosure, there is provided a method for manufacturing a battery cell comprising the steps of:

sequentially stacking a first separator, a negative electrode plate, a second separator and a positive electrode plate to form an electrode assembly; and pressing and sealing the first and second separators by using a sealing member having a folded portion in which the width at both ends is formed wider than the width at the central portion.

Here, the sealing member may be formed of a sealing bar.

More specifically, in the step of pressing and sealing the first and second separators using the sealing member, the sealing member may be formed in a shape corresponding to the edge portions of the first and second separators on which the positive electrode tab and the negative electrode tab are formed, so as to press the whole of the tab edge portions of the first and second separators located on the surface on which the positive electrode tab and the negative electrode tab are formed and a part of the both side edge portions connected to the tab edge portion Further, a heating means may be formed inside the sealing member.

The sealing member may press the first and second separators so as not to interfere with the positive electrode plate and the negative electrode plate. The method may further include forming a recessed portion in the four corner portions of the negative electrode plate, before forming the electrode assembly. At this time, in the step of pressing and sealing the first and second separators using the sealing member, the folded portion of the sealing member may press the first and second separators so as to correspond to the recessed portion in the four corner portions of the negative electrode plate.

According to yet another embodiment of the present disclosure, there is provided a battery module comprising the above-mentioned battery cell.

BRIEF DESCRIPTION OF THE DRAWINGS

FIG. 1 is a view showing an adhesion method between separators according to the related art;

FIG. 2 is a view showing a state in which the sealing member presses the electrode assembly according to an embodiment of the present disclosure; and FIG. 3 is a side view of FIG. 2.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Now, the battery cell according to an embodiment of the present disclosure will be described with reference to FIGS. 2 and 3.

FIG. 2 is a view showing a state in which the sealing member presses the electrode assembly according to an embodiment of the present disclosure. FIG. 3 is a side view of FIG. 2.

Referring to FIGS. 2 and 3, the battery cell according to an embodiment of the present disclosure includes an electrode assembly formed by sequentially stacking a first separator 100, a negative electrode plate 200, a second separator 300 and a positive electrode plate 400 having a rectangular shape, a negative electrode tab 210 formed to protrude from the negative electrode plate 200, and a positive electrode tab 410 formed to protrude from the positive electrode plate 400.

The battery cell is a secondary battery and may be configured into a pouch-type secondary battery. Such a battery cell can be configured by a plurality of numbers, and the plurality of battery cells can be stacked together so as to be electrically connected to each other, thereby forming a battery cell stack. The battery cell may include an electrode lead protruding from the electrode assembly and a pouch case including the electrode assembly. The pouch case is for packaging the electrode assembly, and may be formed of a laminate sheet including a resin layer and a metal layer.

According to the present embodiment, the electrode assembly can be composed of a positive electrode plate, a negative electrode plate, and a separator. More specifically, as shown in FIG. 3, the first separator 100, the negative electrode plate 200, the second separator 300, and the positive electrode plate 400 having a rectangular shape can be sequentially stacked to form an electrode assembly. At this time, the first separator 100 and the second separator 300 have larger size in all four surfaces than the negative electrode plate 200 and the positive electrode plate 400, and therefore, they can be adhered to each other to fix the position of the electrode assembly and the electrode tabs connected thereto.

According to the present embodiment, of the first separator 100 and the second separator 300 are adhered by pressing with the sealing member 500 having a folded portion 520 in which the width at both ends is formed wider than the width at the central portion. Therefore, the first separator 100 and the second separator 300 can formed such that the whole of the tab edge portions of the first and second separators 100 and 300 located on the surface on which the positive electrode tab 410 and the negative electrode tab 210 are formed, and a part of the both side edge portions connected to the tab edge portions are adhered to each other, whereby the inward adhesion width W1 at the tab edge portions 110 and 310 is about 2% to 50%, specifically 10% to 20% smaller than the inward adhesion width at both ends where the tab edge portions and the both side edges portions are connected.

At this time, the sealing member 500 may be formed of a sealing bar.

Further, according to the present embodiment, a heating means can be formed inside the sealing member 500. The separators is adhered by pressing the sealing member 500, and at the same time, the separators is heated via a heating means, so that the separators can be adhered to each other by heat fusion.

Conventionally, for adhesion between separators, a separator adhesion process was performed in which the edge portions of the separators located at the portion where the electrode tabs are formed is pressed using a straight sealing member to adhere the separators. However, when the sealing member is formed in a straight shape to adhere only the tab corners of the separators, a relatively weak adhesive force is acted on the corner portions of the separators, which may cause a folding phenomenon of the separators.

Thereby, according to the present embodiment, the first separator 100 and the second separator 300 are adhered by pressing the formation portion of the negative electrode tab 210 and the positive electrode tab 410 by using a sealing member 500 having a folded portion 520 having a shape corresponding to the edge portion of the first separator 100 and the second separator 300 on which the negative electrode tab 210 and the positive electrode tab 410 are formed, whereby the pressing force through the sealing member 500 can be strongly applied even to the corner portion of the separator, thereby normally realizing the adhesion between the separators even at the corner portion, and preventing the folding phenomenon of the separators at the corner portion.

Further, according to the present embodiment, the sealing member 500 is formed so that the adhesion portion of the first separator 100 and the second separator 300 does not interfere with the negative electrode plate 200 and the positive electrode plate 400. The first separator 100 and the second separator 300 are pressed so that they do not interfere with the positive electrode plate 200 and the positive electrode plate 400.

As described above, the method of forming the adhesion portion of the first separator 100 and the second separator 300 so as not to interfere with the negative electrode plate 200 and the positive electrode plate 400 is most basically not shown in the drawings, but the size of the first separator 100 and the second separator 300 is made larger in four surfaces than the negative electrode plate 200 and the positive electrode plate 400, which can be carried out by an adhesion method using the sealing member 500 so as not to overlap even at any portion.

In this case, the first separator 100 and the second separator 300 can be made larger than the negative electrode plate 200 and the positive electrode plate 400, or the region pressed and adhered by the sealing member 500 can be made smaller.

Alternatively, as shown in FIG. 2 of the present disclosure, before the step of forming the electrode assembly, at the four corner portions of the negative electrode plate 200 interposed between the first separator 100 and the second separator 300, a recessed portion 220 corresponding to the adhesive shape can be formed so that the negative electrode plate does not interfere with the portion where a part of the edges on both side surfaces of the first separator 100 and the second separator 300 are adhered. Since the seal member 500 is formed so that the width at both ends is wider than the width at the central portion, and thus has a folded portion 520, interference occurs between the folded portion 520 of the sealing member 500 and the negative electrode plate 200 during the pressing of the first and second separators 100 and 300. Therefore, according to the present embodiment, the recessed portion 220 is pressed so as to correspond to the portion where the folded portion 520 presses and the four corner portions of the negative electrode plate 200 positioned, whereby even when the sealing member 500 presses the separators, the negative electrode plate 200 may not interfere with the pressed portion. Therefore, it is possible to prevent safety problems such as damage to the negative electrode plate 200 due to the pressing of the sealing member 500. Also, as shown in FIG. 2, the positive electrode plate 400 has larger size in all four surfaces than the negative electrode plate 200, and a recessed portion 220 corresponding to the adhesive shape is formed at the four corners of the negative electrode plate, so that the negative electrode plate does not interfere with a portion to which a part of both side edge portions of the first and second separators are adhered.

The battery cells described above can be included in a battery module, and these battery modules can be included in a battery pack. The battery pack may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although preferred embodiments of the present disclosure have been shown and described above, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS

100: first separator
200: negative electrode plate
210: negative electrode tab
220: recessed portion
300: second separator
400: positive electrode plate
410: positive electrode tab
500: sealing member
510: main portion
520: two folded portions

INDUSTRIAL APPLICABILITY

A battery cell and a method for manufacturing the same according to an embodiment of the present disclosure provide an effect of preventing a folding phenomenon of the separator during an adhesion process between the separators, and adhering the separators so as not to occur interference with the electrode.

The effects of the present disclosure are not limited to the effects mentioned above and additional other effects not described above will be clearly understood from the description of the appended claims by those skilled in the art.

The invention claimed is:

1. A battery cell comprising:

an electrode assembly including a first separator, a negative electrode plate, a second separator and a positive electrode plate having a rectangular shape that are sequentially stacked;

a negative electrode tab protruding from the negative electrode plate; and a positive electrode tab protruding from the positive electrode plate, wherein the first separator and the second separator each have a larger length and a larger width than a respective length and width each of the negative electrode plate and the positive electrode plate, and entire tab edge portions of the first and second separators aligned with the positive electrode tab and the negative electrode tab and a part of opposite side edge portions of the first and second separators adjacent to the tab edge portions are adhered to each other, wherein an adhesion width of the first and second separators at the tab edge portions is smaller than an adhesion width at corners of the first and second separators where each tab edge portion and the side edge portions are connected, wherein the positive electrode plate has a larger length and a larger width than a respective length and width of the negative electrode plate, and the negative electrode plate has recessed portions at four corners of the negative electrode plate, so that the negative electrode plate does not overlap adhered portions of the first and second separators, and wherein the recessed portions have a shape complementary to a shape of bonded regions of the side edge portions of the first and second separators.

2. The battery cell according to claim 1, wherein the adhesion width of the first and second separators at the tab edge portion is 2% to 50% smaller than the adhesion width at the corners of the first and second separators.

3. The battery cell according to claim 1, wherein the positive electrode plate and the negative electrode plate do not overlap adhered portions of the first and second separators.

4. A battery module comprising the battery cell according to claim 1.

* * * * *